United States Patent
Franks et al.

(10) Patent No.: US 9,315,203 B2
(45) Date of Patent: Apr. 19, 2016

(54) LEVELING RAILWAY VEHICLE AND RELATED SYSTEMS AND METHODS

(75) Inventors: James Franks, Chapel Hill, NC (US); Adam W. Kohler, Greensboro, NC (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/000,472

(22) PCT Filed: Feb. 21, 2012

(86) PCT No.: PCT/US2012/025863
§ 371 (c)(1),
(2), (4) Date: Sep. 4, 2014

(87) PCT Pub. No.: WO2012/115927
PCT Pub. Date: Aug. 30, 2012

(65) Prior Publication Data
US 2015/0021445 A1    Jan. 22, 2015

Related U.S. Application Data

(60) Provisional application No. 61/445,252, filed on Feb. 22, 2011.

(51) Int. Cl.
*B61F 5/00* (2006.01)
*B61F 5/02* (2006.01)
*B61F 5/14* (2006.01)
(Continued)

(52) U.S. Cl.
CPC ... *B61F 5/02* (2013.01); *B61B 1/02* (2013.01); *B61F 5/14* (2013.01); *B61L 99/00* (2013.01); *F16F 1/121* (2013.01)

(58) Field of Classification Search
CPC .................... B60G 17/01933; B60G 17/0272; B60G 17/04; B60G 17/056; B60G 2202/154; B60G 2202/32; B60G 2204/112; B60G 2300/10; B60G 2500/206; B60G 2800/012; B60G 2800/9122; B61F 5/02; B61F 5/14; B61F 5/148
See application file for complete search history.

(56) References Cited

U.S. PATENT DOCUMENTS 4,368,672 A * 1/1983 Germer ...................... 105/199.3
4,505,457 A * 3/1985 Okada et al. ...................... 267/3

(Continued)

FOREIGN PATENT DOCUMENTS

| | | | |
|---|---|---|---|
| JP | 2005125958 | 5/2005 | |
| JP | 2010076608 | 4/2010 | ............... B61F 5/06 |
| WO | 2012025863 | 2/2012 | ............... B61F 5/14 |

OTHER PUBLICATIONS

Wikipedia page on Honda Stepwgn—admitted prior art.

*Primary Examiner* — Jason C Smith
(74) *Attorney, Agent, or Firm* — MacCord Mason PLLC

(57) ABSTRACT

Leveling railway vehicles, leveling secondary suspension systems, lift-systems for suspension systems, and other related systems and methods are shown and described. In one example, a railway vehicle includes a superstructure, a bogey, and a leveling secondary suspension system. The leveling suspension system includes at least one spring positioned between the superstructure and the bogey, and a secondary suspension-mounting lift system (SMLS) interfaced with coil spring. The SMLS includes a spring-mount (SM) and a piston assembly. In operation, pressurized hydraulic fluid acts on the piston and lifts the superstructure, thereby allowing the superstructure's access to be raised to a desired height, e.g. a platform height.

32 Claims, 13 Drawing Sheets

(51) Int. Cl.
*F16F 1/12* (2006.01)
*B61B 1/02* (2006.01)
*B61L 99/00* (2006.01)

(56) References Cited

U.S. PATENT DOCUMENTS

| | | | | |
|---|---|---|---|---|
| 5,558,368 | A * | 9/1996 | Cerny et al. | 280/781 |
| 5,769,400 | A * | 6/1998 | Holzl et al. | 267/64.16 |
| 6,103,278 | A * | 8/2000 | Lluch | 426/90 |
| 6,550,394 | B1 * | 4/2003 | Polley | 105/164 |
| 7,168,370 | B2 * | 1/2007 | Hommen et al. | 105/453 |
| 7,185,592 | B2 * | 3/2007 | Hommen et al. | 105/453 |
| 7,243,606 | B2 * | 7/2007 | Hommen et al. | 105/453 |
| 7,520,494 | B2 * | 4/2009 | Gaile | 267/221 |
| 8,079,310 | B2 | 12/2011 | Popjoy et al. | 105/453 |
| 8,235,366 | B2 | 8/2012 | Anton | 267/218 |
| 8,899,159 | B2 * | 12/2014 | Zanutti et al. | 105/198.3 |
| 2003/0107161 | A1 * | 6/2003 | Teichmann et al. | 267/64.11 |
| 2004/0016361 | A1 * | 1/2004 | Teichmann et al. | 105/164 |
| 2007/0035103 | A1 * | 2/2007 | Anton | 280/124.16 |
| 2008/0210119 | A1 * | 9/2008 | Lehmair et al. | 105/199.3 |
| 2012/0167797 | A1 | 7/2012 | Woreen et al. | 105/209 |
| 2015/0021445 | A1 * | 1/2015 | Franks et al. | 246/218 |

* cited by examiner

LEVELING RAILWAY VEHICLE AND RELATED SYSTEMS AND METHODS

FIELD OF TECHNOLOGY

The current disclosure relates generally to leveling systems for railway vehicles, and more particularly to leveling secondary suspension systems for railway vehicles.

BACKGROUND

Railway vehicles, particularly those used for public transportation, often include a superstructure for carrying passengers. The superstructure rides on a bogey, also sometimes referred to as a truck, which includes at least one wheel axle, more typically two, for traveling along the rails. Generally, a primary suspension system is positioned between the wheel axles and the bogey and a secondary suspension system is positioned between the bogey and superstructure.

Superstructures have at least one access, e.g. a door, to allow passengers or cargo to enter or exit the superstructure when the railway vehicle reaches a loading platform. Because load may vary, the superstructure may sometimes need to lift or lower a variable distance to allow the floor of its access to reach the approximate level of the platform.

For a variety of reasons, applicants are dissatisfied with existing solutions for lifting and lowering superstructures.

SUMMARY

The current disclosure is directed to, inter alia, systems and methods for leveling superstructures of a railway vehicle. By way of summary, applicants have developed leveling secondary suspension systems (also referred to herein as "leveling suspensions") that allows for efficient leveling of the superstructure in a narrow geometric configuration that is readily integrated across a wide variety of bogey/superstructure designs. The current disclosure also includes a variety of methods and control system related to leveling suspensions.

In one example, a railway vehicle includes a superstructure, a bogey, and a leveling suspension including at least one coil spring positioned between the superstructure and the bogey. A secondary suspension-mounting lift system (SMLS) is interfaced with coil spring. The SMLS includes a spring-mount (SM) and a piston assembly. In operation, the railway vehicle comes to a stop at a station having a platform. A leveling sensor determines that the superstructure access door is below platform level. Pressurized hydraulic fluid acts on at least one piston and lifts the superstructure until the vehicles access door is at a predetermined level with respect to the platform level, e.g., approximately equal height as the platform level. After passenger or cargo loading and unloading, for example, fluid is released and the piston lowers the superstructure to the desired level.

In many examples, railway vehicles will include more than one leveling suspension, e.g., 2, 3, 4, 5, 6, 7, 8, etc. In examples including multiple leveling suspensions, leveling suspensions may be positioned to raise the superstructure evenly, e.g., at least one of a front and back piston pressurized to raise the superstructure evenly and at least both sides pressured to raise the superstructure evenly.

The above summary was intended to briefly summarize some of the present disclosure. Additional embodiments will be set forth in more detail in the figures and detailed description below. It will be apparent, however, that the detailed description is not intended to limit the present invention.

DETAILED DESCRIPTION OF SOME EXAMPLES

Figure 1:
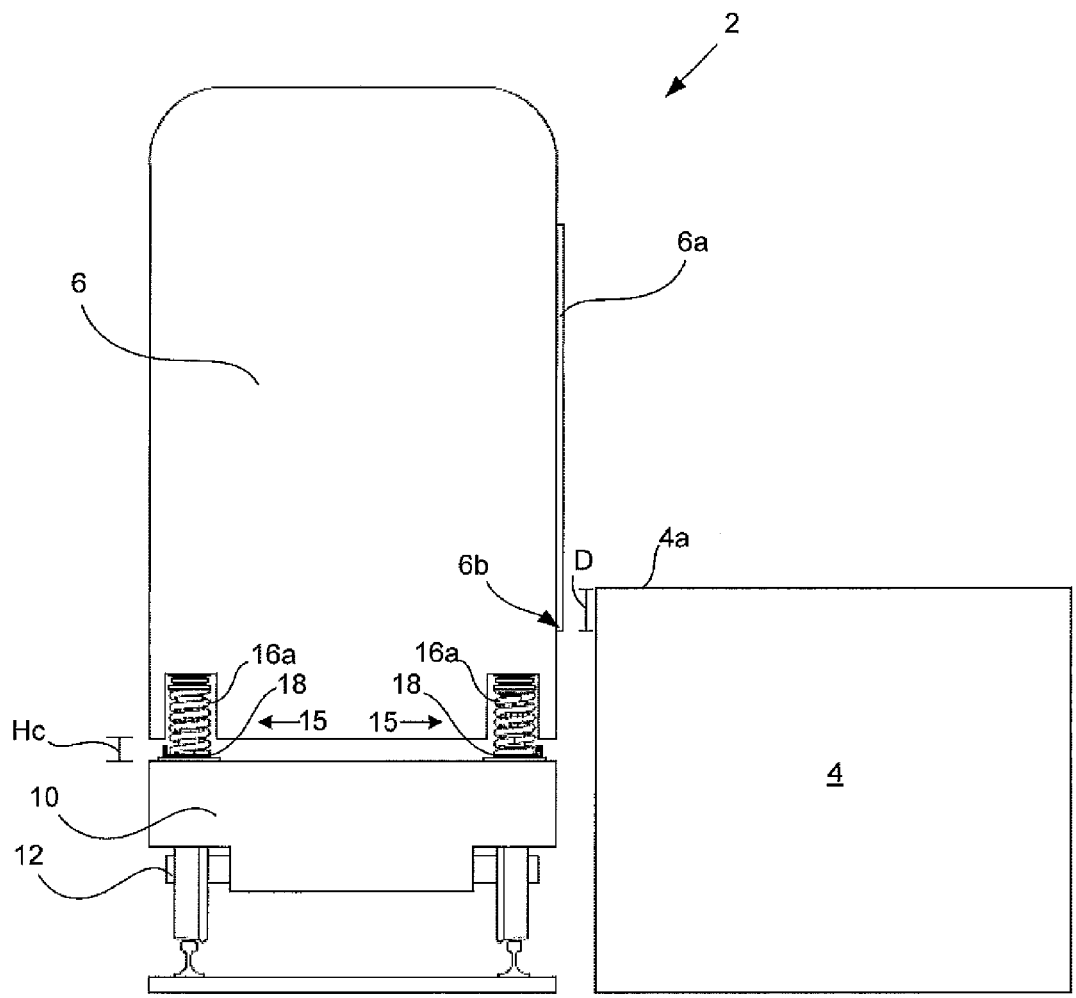
FIG. 1 illustrates one example of a railway vehicle as disclosed herein having a leveling suspension system.

FIG. 1 illustrates a cutaway front view of railway vehicle 2, which is one example of a railway vehicle disclosed herein. Vehicle 2 is shown positioned adjacent to platform 4. In terms of general structure, vehicle 2 includes superstructure 6 and bogey 10 having wheel axle 12. Superstructure 6 includes an access 6a, e.g. a door, having an access floor 6b. A primary suspension (not visible) is positioned between axle 12 and bogey 10. A pair of leveling secondary suspension systems 15 are positioned between bogey 10 and superstructure 6. Leveling secondary suspensions 15 include a spring 16a interfaced with a suspension-mounting lift system (SMLS) 18.

In terms of general function, when traveling, the superstructure may be in a lowered coasting configuration ($H_c$) relative to the bogey. When stopped at platform 4, for example to load or unload, SMLS 18 may be used to raise superstructure 6 to reduce the distance D between platform level 4a and access level 6b. Raising and lowering may be achieved by a variety of SMLS examples.

Figure 2:
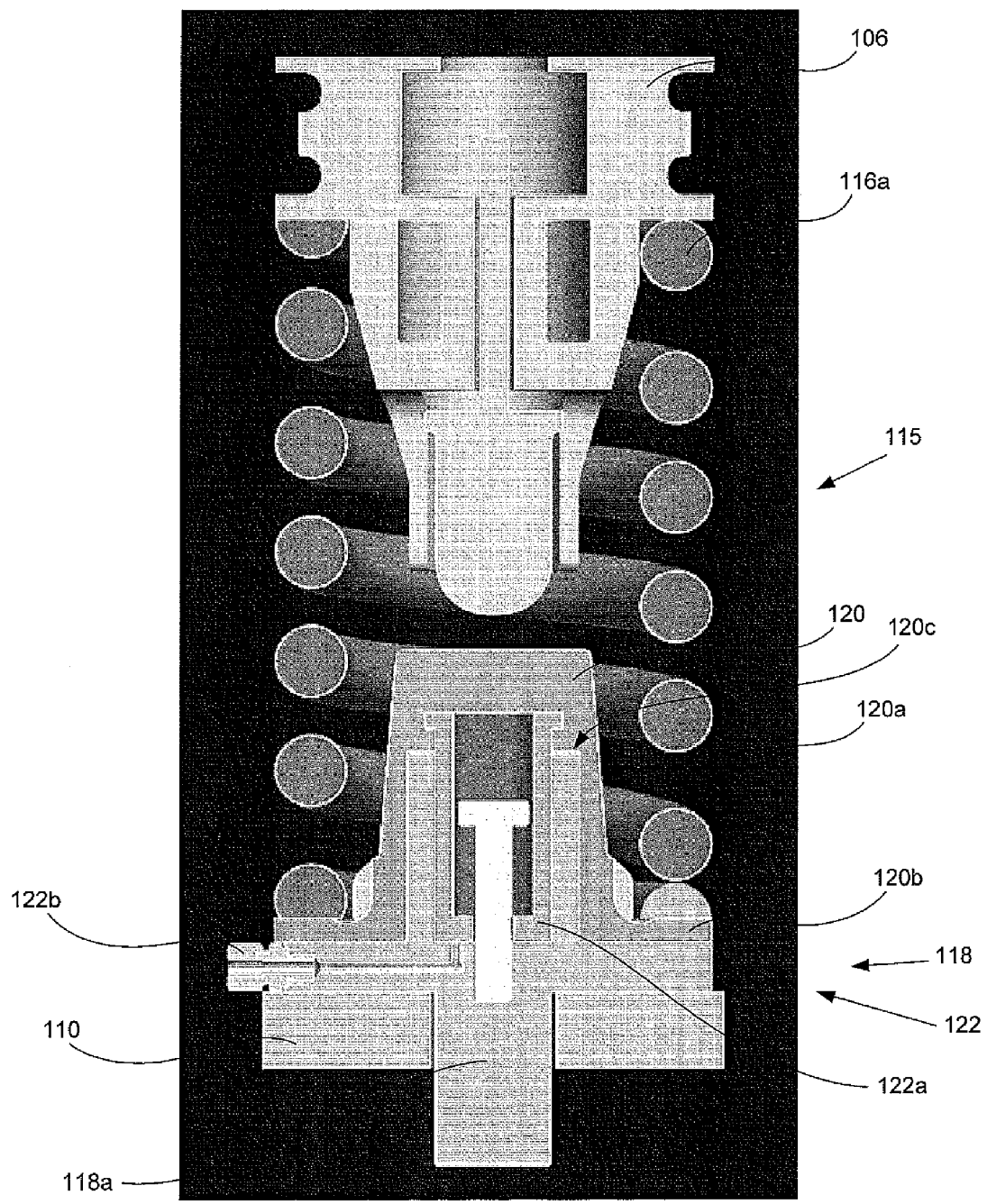
FIG. 2 is a cutaway view of a leveling suspension system.

FIG. 2 illustrates a cut away side view of one example of a leveling suspension, referred to as leveling suspension 115. In this example, leveling suspension 115 includes spring 116a interfaced with SMLS 118. An upper end of the leveling suspension 115, e.g. an upper surface of spring 116a may be considered interfaced with superstructure 106 or configured to interface with a superstructure. A lower end 118a of the SMLS may be considered interfaced with a bogey 110 or configured to attach to a bogey. SMLS is one example of an SMLS as disclosed herein, and may be considered a bottom mounting SMLS, because it is mounted to the bottom of spring 116a.

SMLS 118 includes spring-mount (SM) 120 and a piston assembly 122. SM 120 includes hollow cylinder 120a positioned within coil spring 116a. SM also includes flange 120b connected to the cylinder. Flange 120b extends externally from the coil spring and abuts one end of the coil spring. In this example, flange 120b abuts the bottom end of spring 116a. In many examples, flanges will be frictionally attached to the spring such that, for example, no hard connection between the spring and flange is required for positional and operational stability. SM 120 may also include expansion surface 120c for increasing the effective area of the lift-force. As seen better in FIG. 3, hydraulic fluid is capable of achieving fluid communication with, and acting on, expansion surface 120c.

Piston assembly 122 includes piston 122a sized to fit within hollow cylinder 120a. Piston assembly 122 also includes an extrusion 122b for hydraulic interface, the extrusion being in fluid communication with the piston.

Figure 3:
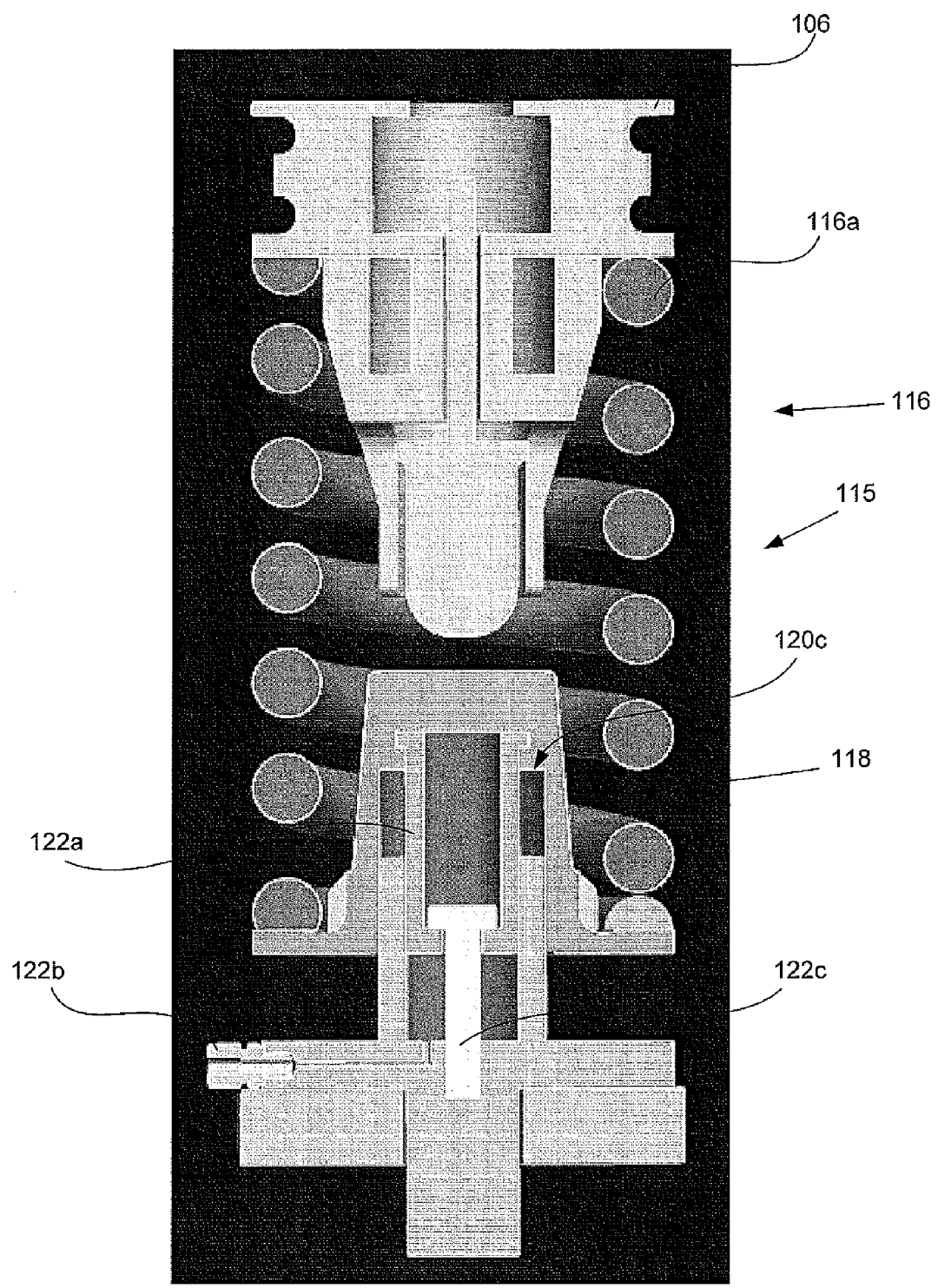
FIG. 3 illustrates the leveling suspension of FIG. 2 in a different position.

FIG. 3 illustrates the leveling suspension 115 previously described, whereby pressurized hydraulic fluid inserted through extrusion 122b acts on piston 122a and lifts spring 116a, thereby lifting the superstructure. The piston assembly may also include a stop, e.g., stop 122c, to prevent the piston from extending beyond a predetermined distance.

Leveling suspensions disclosed herein may be readily integrated with a variety of bogey/superstructure designs to provide a highly responsive and functional system in a narrow geometric space, which further eliminates the need for additional standalone leveling systems.

Figure 4:
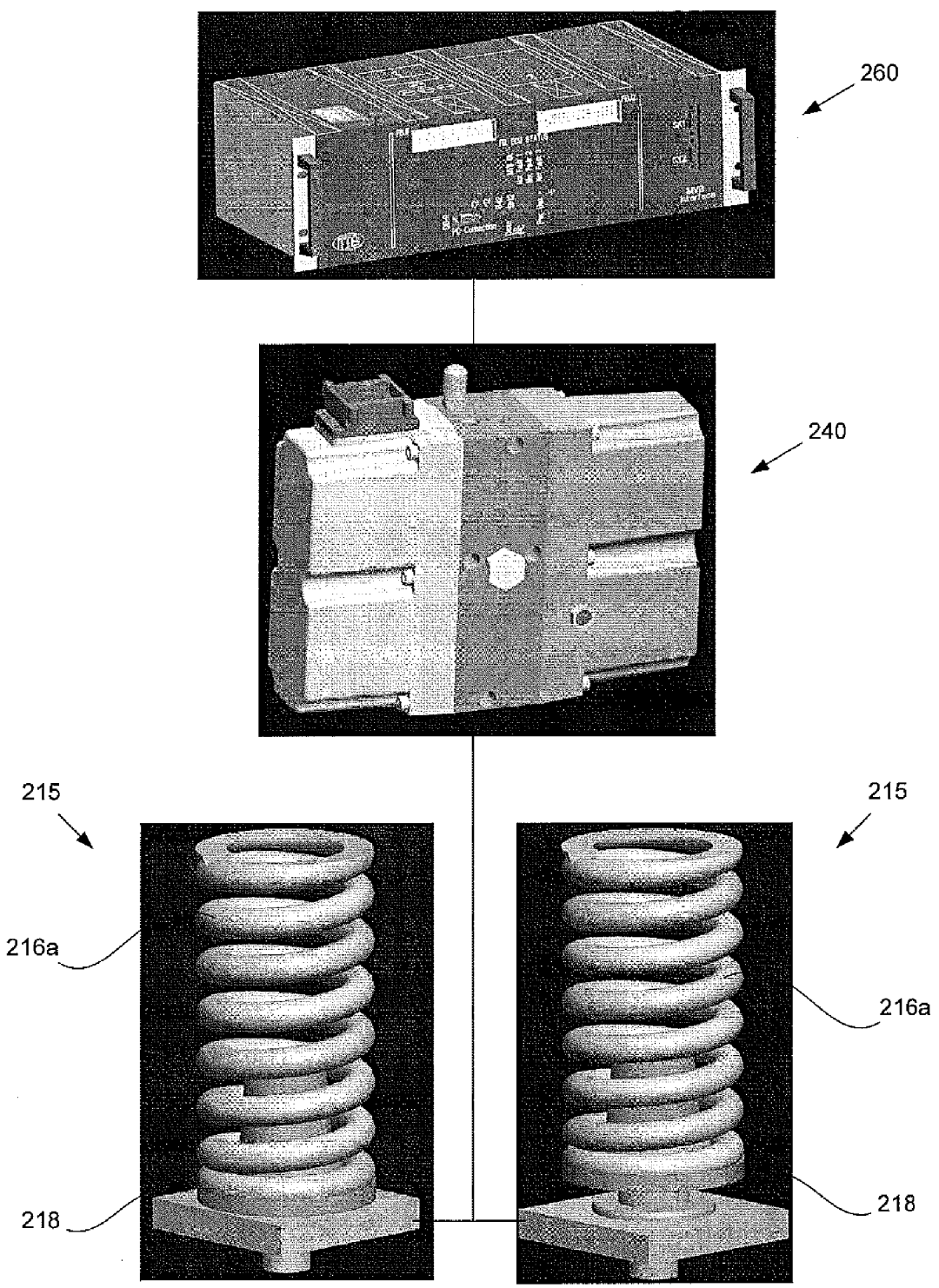
FIG. 4 is a diagram depicting the interface of a leveling suspension a HPU, and an ECU.

FIG. 4 illustrates, generally, a lifting suspension 215 including spring 216a interfaced with SMLS 218; a hydraulic power unit (HPU) 240; and an electronics control unit (ECU) 260. In this example, ECU 260 sends signals to the HPU to raise or lower the SMLS, thereby allowing for the leveling of a superstructure.

Figure 5:
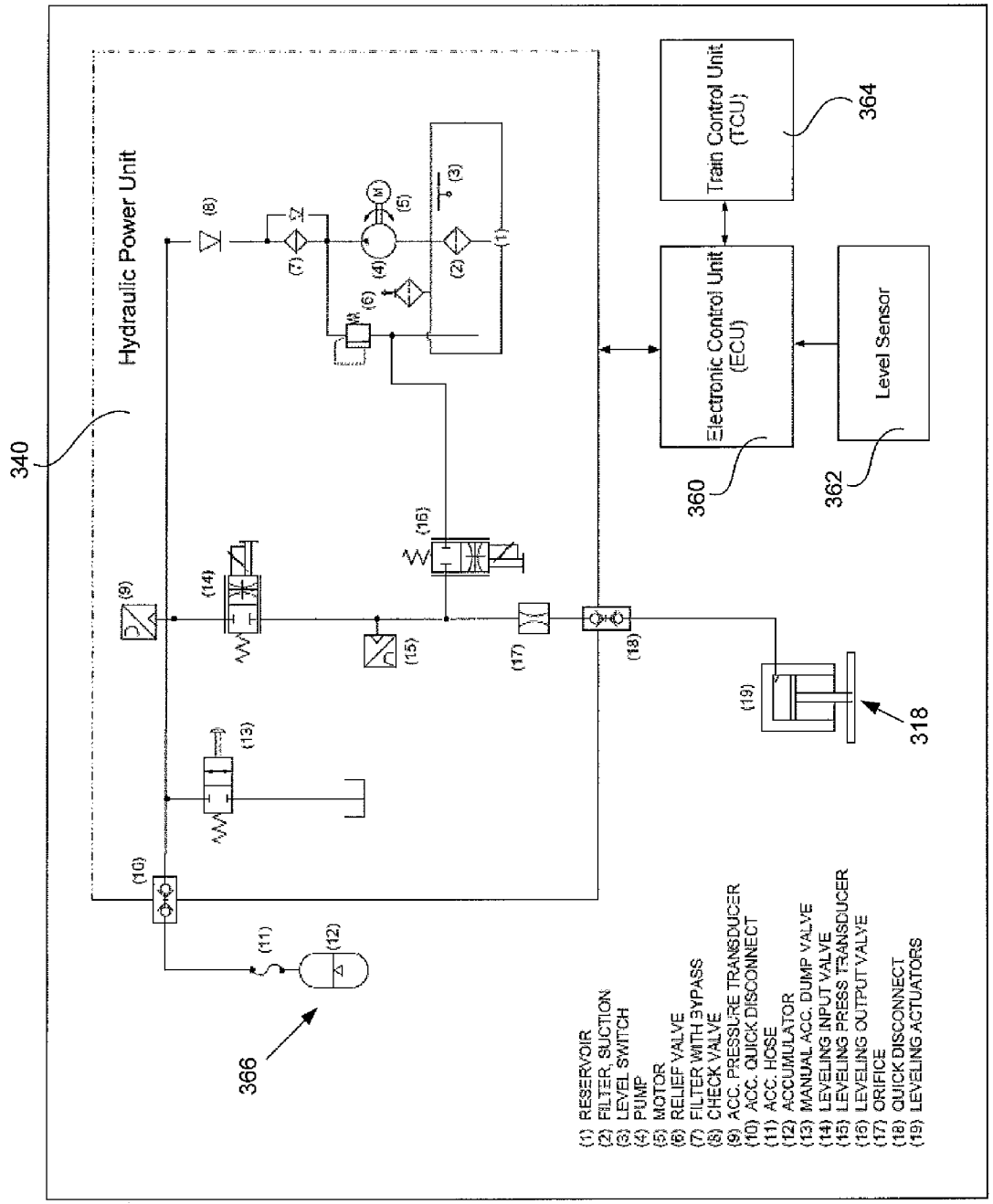
FIG. 5 is a schematic depicting an SMLS, a HPU, an ECU, a TCU and a level sensor.

FIG. 5 illustrates another schematic including SMLS 318, HPU 340, and ECU 360. At least one of a leveling sensor 362 and train control unit 364 may also be in communication with an ECU, as illustrated. Additionally, accumulator 366 is shown as a discrete component in communication with the HPU, but in some examples, an accumulator may be an internal component of the HPU. Components of the schematic are briefly described in the legend.

A variety of leveling sensors may be used it practice the teachings contained herein. In terms of general structure, leveling sensors can include any device configured to determine the suspension settlement due to load, e.g., passenger load. For example, a leveling sensor may include a superstructure-component for mounting to the superstructure, a bogey-component for mounting to the bogey, and a relative positioning device positioned to determine the movement of one component relative to another. Relative positioning devices may detect angular displacement, linear displacement, force, etc.

In terms of operation, systems may determine suspension settlement based on predefined settlement logic. Table 1 below illustrates one prophetic example of settlement logic which may be used to determine suspension settlement and appropriate leveling. In this example, AW0 is pre-determined such that the superstructure access is about level with platform level.

TABLE 1

| Load Code | Actual Mass (kg) | Suspension Settlement | Sensor (degrees, mm, pressure/unit, etc.) | Output |
|---|---|---|---|---|
| AW0 | 15,000 | 0 mm | a | q |
| AW1 | 16,000 | 5 mm | b | r |
| AW2 | 18,000 | 25 mm | c | s |
| AW3 | 20,000 | 35 mm | d | t |
| AW4 | 21,000 | 40 mm | e | u |

As illustrated in the table, based on leveling sensor reading, an output is generated. When the output is q, SMLS raises the superstructure about 0 mm. When the output is r, SMLS raises the superstructure about 5 mm. When the output is s, SMLS raises the superstructure about 25 mm. When the output is t, SMLS raises the superstructure about 35 mm. When the output is u, SMLS raises the superstructure about 40 mm. As noted, Table 1 represents just one example of logic. Logic may vary from example to example, and be readily determinable to one of ordinary skill in the art based on, inter alia, suspension design parameters and a known platform height. Further, AW0 may be different for various platforms along a fine, with the AW0 being sequenced to correspond to line sequencing or detectable through a signal generating source at the platform.

Figure 6:
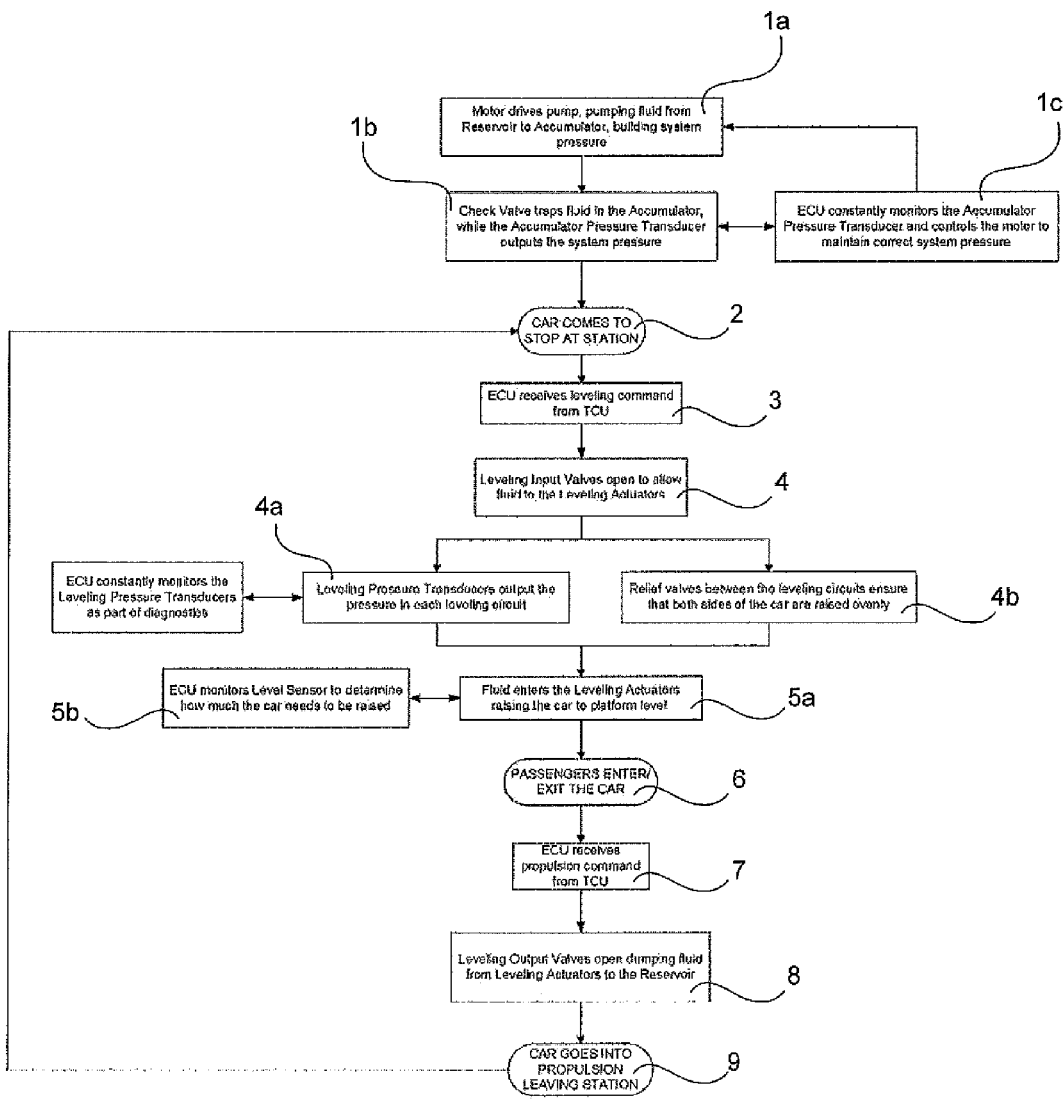
FIG. 6 depicts a process flow example.

FIG. 6 illustrates one example of a process for operating components previously disclosed, e.g. in FIG. 5. In step 1, ECU 360 maintains system pressure, which may include monitoring the accumulator pressure transducer (9) and controlling the motor (5) to maintain correct system pressure. For example, in step 1a, motor (5) drives pump (4), pumping fluid from reservoir (1) to accumulator (12), thereby building system pressure, which output by accumulator pressure transducer (9) in step 1b.

In step 2, a railway vehicle comes to a stop at a station (See FIG. 1 for example). In step 3, ECU 360 receives leveling command from TCU 364. In step 4, leveling input valves (14) open to allow fluid to the leveling actuators (19). In step 4a, leveling pressure transducers (15) output the pressure in each leveling circuit. In step 4b, relief valves (6) between the leveling circuits ensure that both sides of the superstructure are raised evenly. Level circuits may additionally determine that the front and back portions of the superstructure are raised evenly. In step 4c, ECU monitors leveling pressure transducers (15) as part of diagnostics. In step 5a, fluid enters the leveling actuators (19), raising the superstructure to platform level. In step 5b, ECU 360 monitors level sensor 362 to determine how much the vehicle needs to be raised. In step 6, passengers enter or exit, the superstructure. In step 7, ECU 360 receives propulsion command from TCU 364. In step 8, leveling output valves (16) dump fluid from leveling actuators (19) to reservoir (1). In step 9, the vehicle goes into propulsion.

Figure 7:
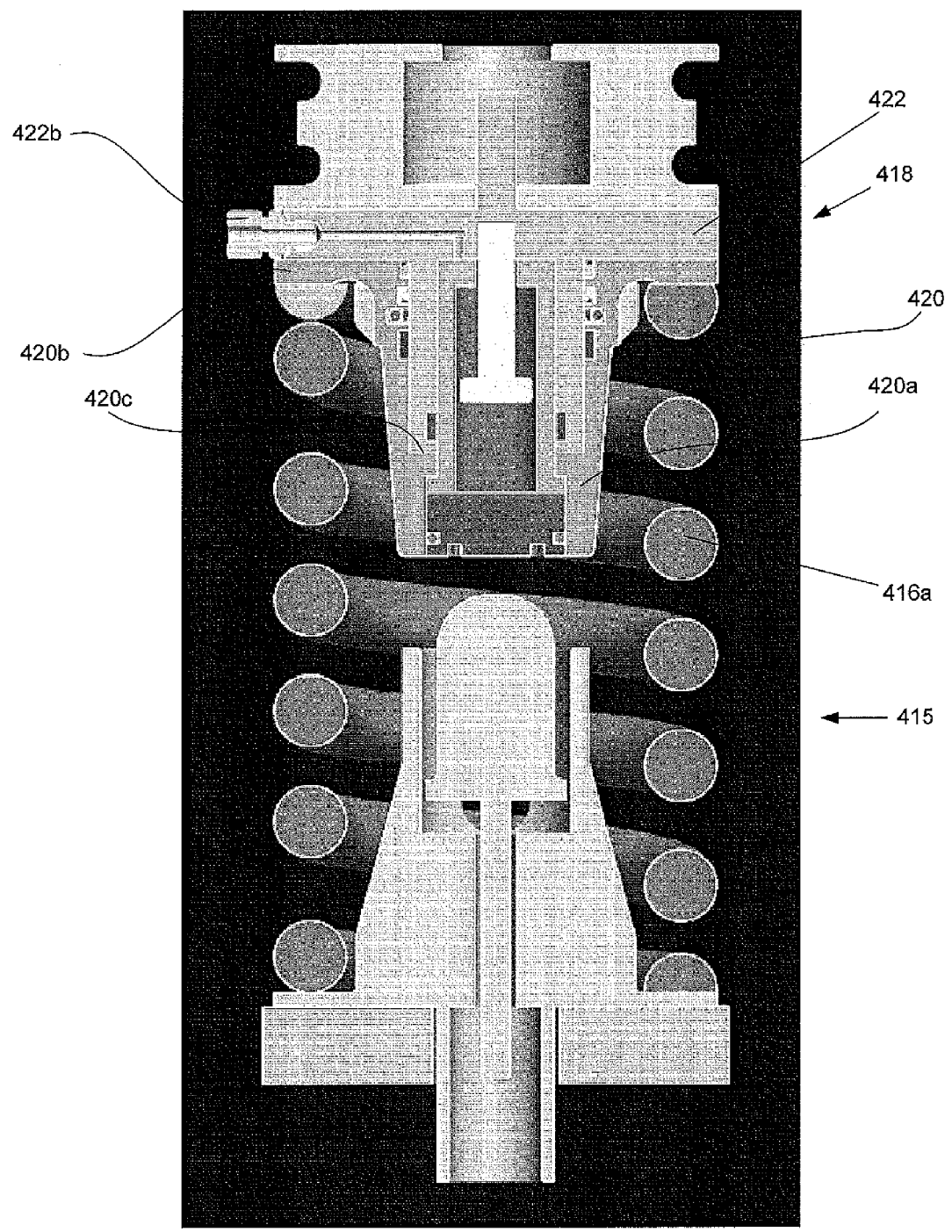
FIG. 7 is a cutaway view of another example of a leveling secondary suspension system.
Figure 8:
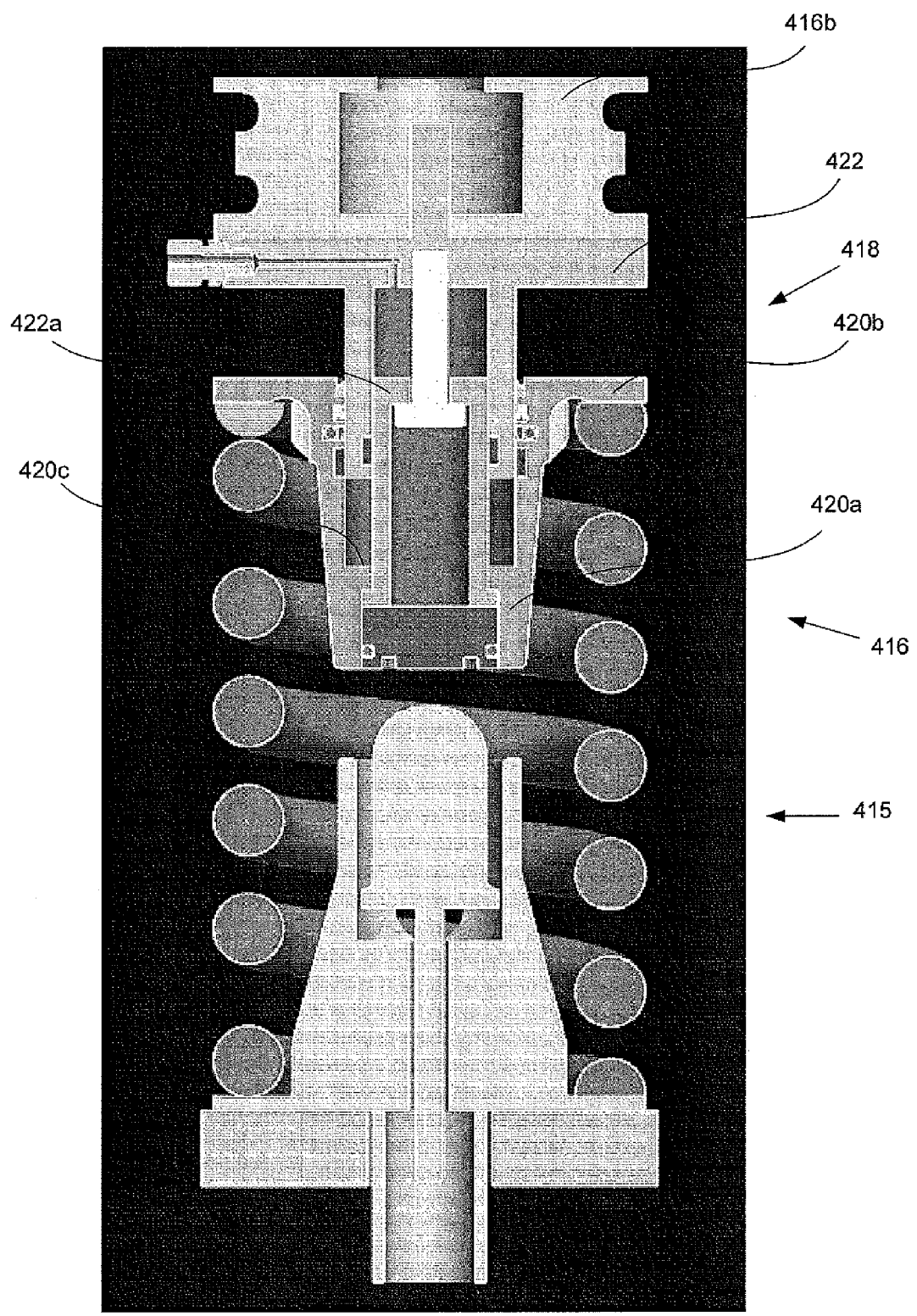
FIG. 8 illustrates the suspension system FIG. 7 in a different position.

FIGS. 7 and 8 illustrate leveling suspension system 415, which is another example of a leveling suspension as disclosed herein. System 415 includes spring 416a and SMLS 418. SMLS 418 includes SM 420 and piston assembly 422, with cylinder 420a extending into the top of spring 416a and flange 420a abutting the top of spring 416a. SMLS 418 may be considered a top mounted SMLS. FIG. 8 illustrates the leveling suspension 415, whereby pressurized hydraulic fluid inserted through extrusion 422b acts on piston 422a and lifts upper end 416a, thereby lifting the superstructure. Hydraulic fluid may also act on expansion surface 420c.

Figure 9:
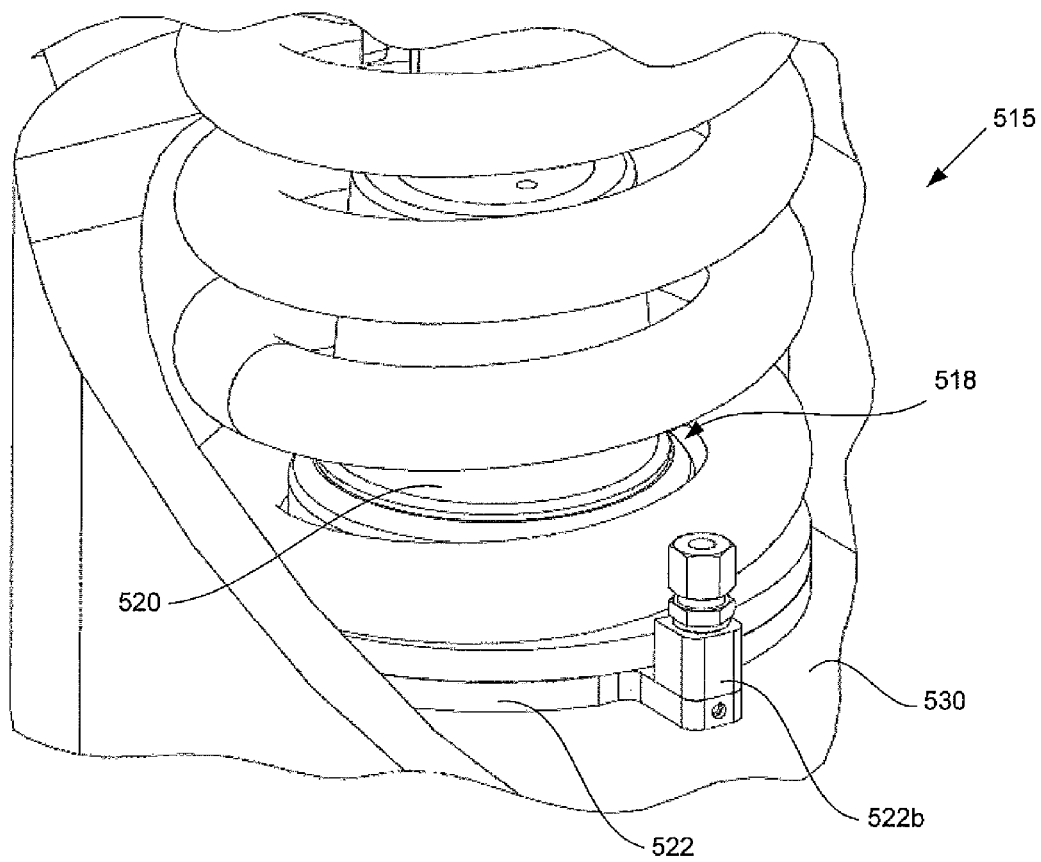
FIG. 9 shows a perspective view of another example of a leveling suspension system.
Figures 10A, 10B:
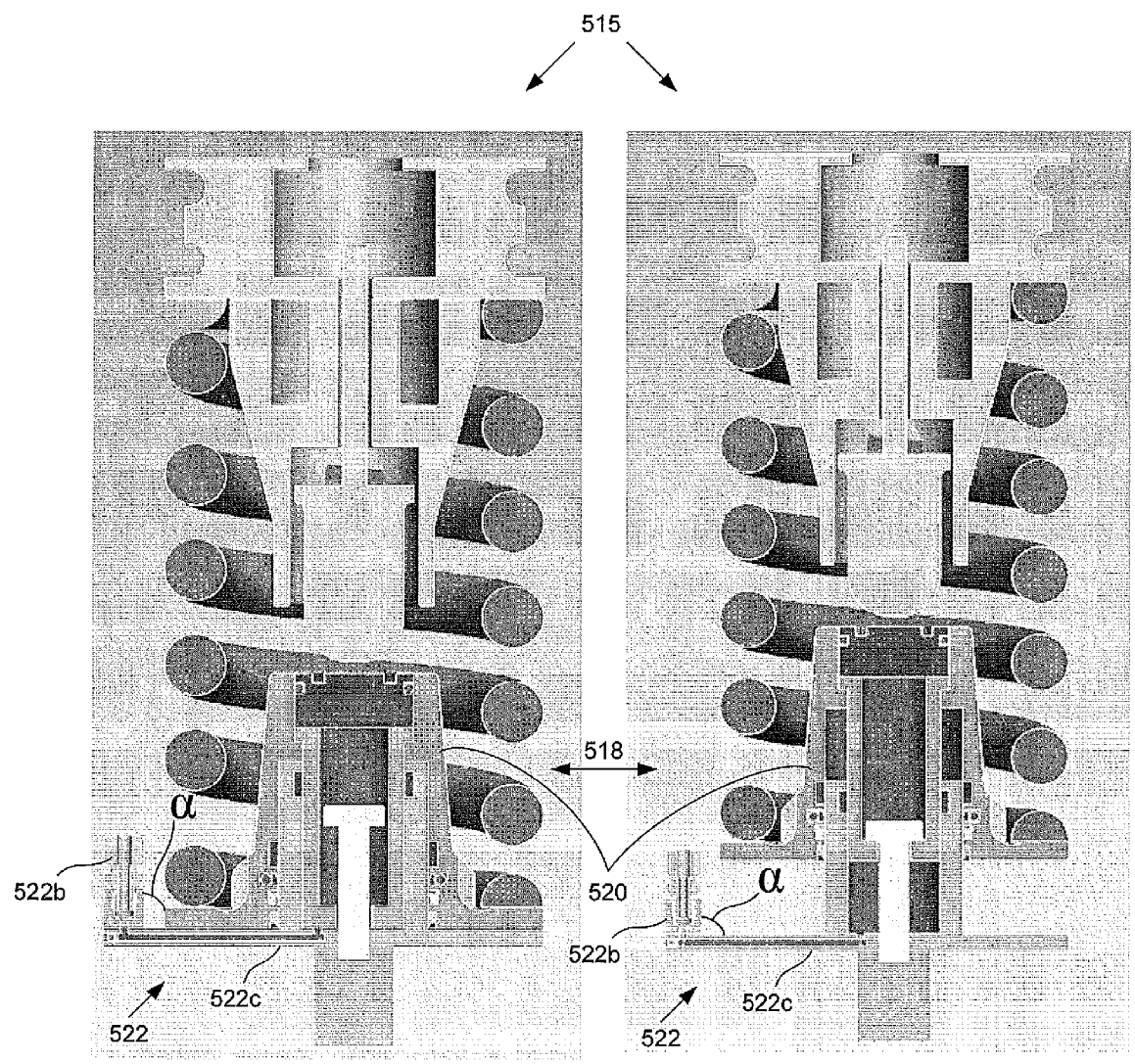
FIGS. 10a and 10b show side cutaway views of the system shown in FIG. 9.

FIG. 9 illustrates a perspective view of a partial leveling system 515, which is another example of a leveling suspension system as disclosed herein. Leveling system 515 includes SMLS 518 having SM 520 and piston assembly 522. FIGS. 10a and 10b show side cutaway views of the system shown in FIG. 9 in a coasting configuration and a raised configuration, respectively. Referring to FIGS. 9, 10a and 10b, piston assembly 522 includes an angled extrusion 522b. In this example, extrusion 522b is positioned at an angle $\alpha=90°$, but in other examples extrusions can be positioned at other angles, e.g., $\alpha=90°\pm45°$. Further, while this example is shown as a bottom mount system, similar top mount systems are apparent based on the teachings contained herein.

By using an angled extrusion, applicants have created, inter alia, a thinner base plate 522c, which allows the leveling suspension system to fit into an even smaller vertical geometric envelope. As a result, any of a variety of benefits may be achieved, including not requiring a change in length of existing springs for specific customer applications.

Figure 11:
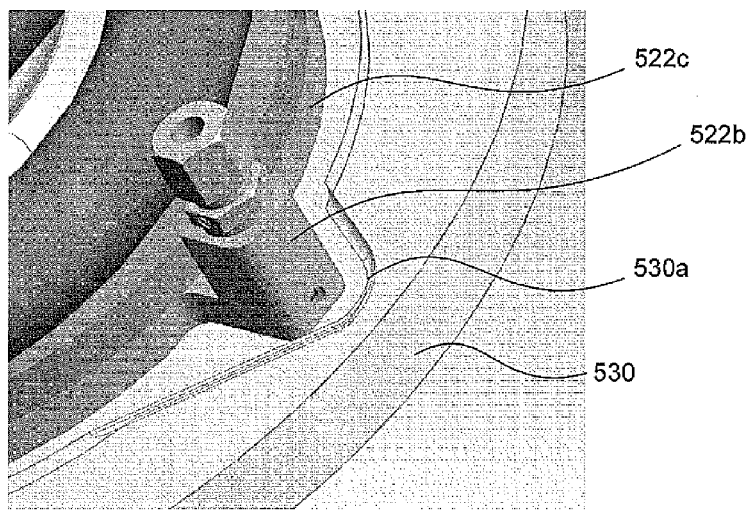
FIG. 11 is a close-up view of the system shown in FIG. 9.

FIG. 11 shows a top view of a bogey section 610, including a view of seat 630 for receiving, e.g. frictionally, a leveling system.

Figure 12:
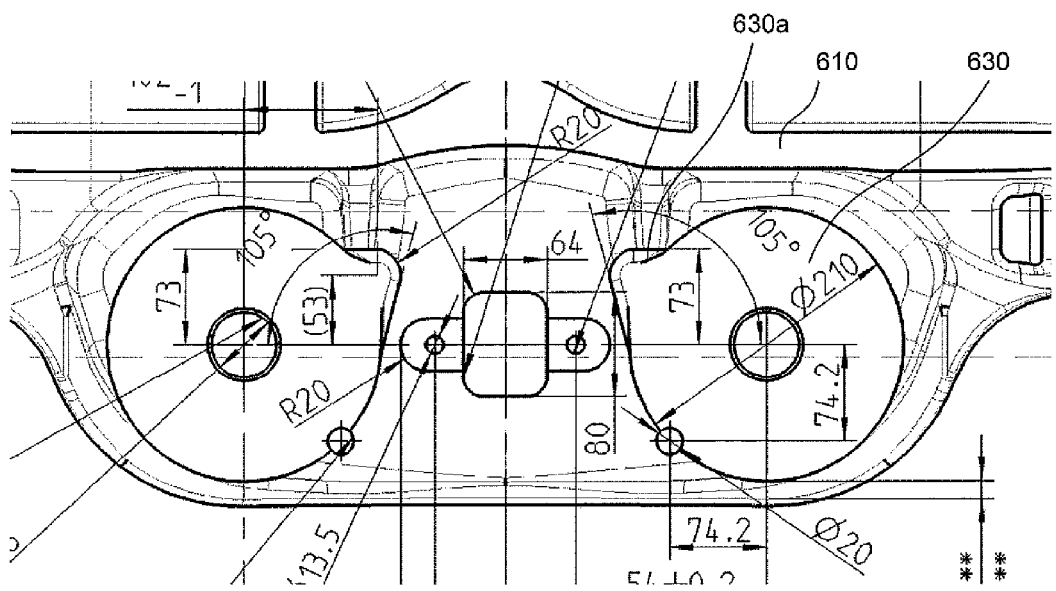
FIG. 12 shows a portion for receiving a leveling suspension system.

FIG. 12 shows a side view of vehicle 700 and a close up partial view of vehicle 700. Vehicle 700 includes a superstructure 706 having a pair of accesses 706a. Leveling suspension systems 715a and 715b, which may be considered similar to the system 515 previously described, are also visible. Also visible in FIG. 12 are a pair of extrusions 722b for receiving a flexible hydraulic line (not shown to facilitate viewing). Flexible lines may be used in many examples to accommodate the lifting of the superstructure and shimming of the suspension. Although not shown, superstructure 706 includes another pair of leveling suspension systems 715c and 715d on the opposite side (not shown).

Figure 13:
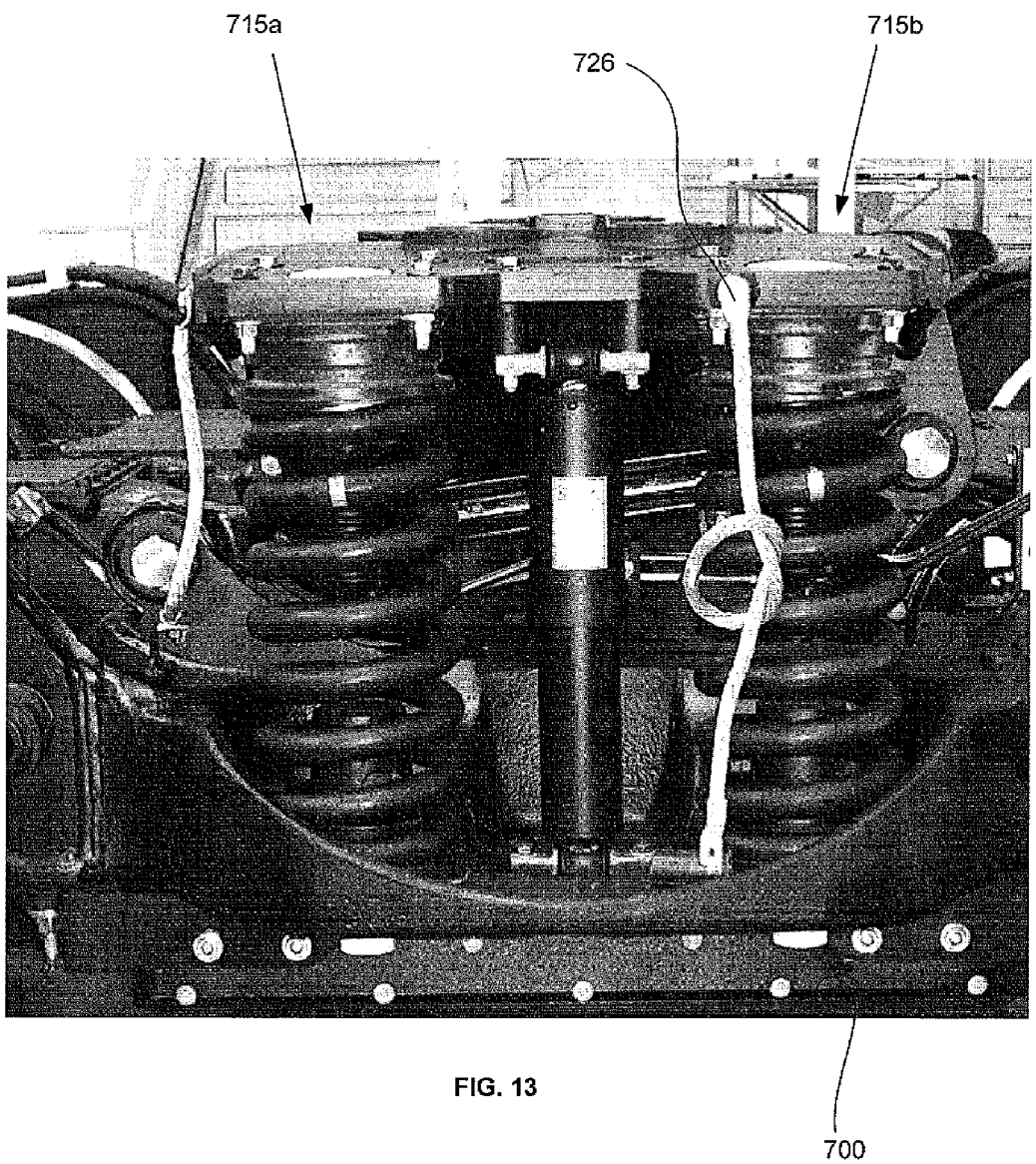
FIG. 13 shows a leveling suspension system interfaced with a bogey.
Figure 14:
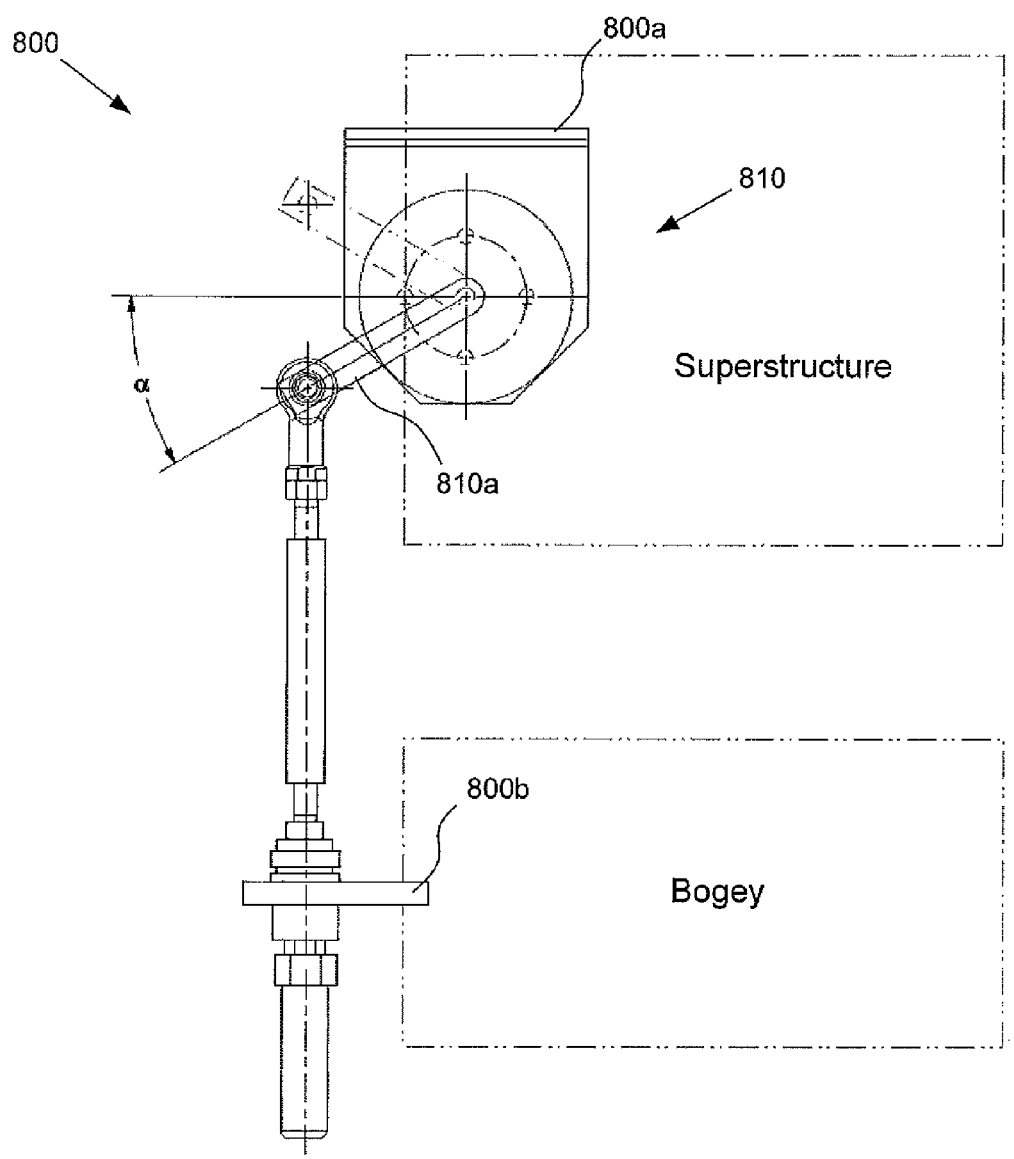
FIG. 14 shows an example of a leveling sensor.

As noted, a variety of leveling sensors may be used it practice the teachings contained herein. FIG. 13 illustrates one example of a leveling sensor, sensor 800, which detects suspension settlement based on angular displacement. In this example, sensor 800 includes superstructure-component 800a for mounting to the superstructure, a bogey-component 800b for mounting to the bogey, and relative positioning device 810 positioned to determine the suspension settlement. Device 810 includes an arm 810a that displaces along an angle α depending on superstructure load and suspension settlement. A milliamp signal sent from device 810 to an ECU may be proportional to angle α, thereby controlling the SMLS.

Table 2 below illustrates one prophetic example of system logic which may be used to determine suspension settlement and appropriate leveling using leveling sensor 800. In this example, AW0 is pre-determined such that the superstructure access is about level with platform level.

TABLE 2

| Load Code | Actual Mass (kg) | Suspension Settlement | Sensor (degrees) | Output Current (mA) |
|---|---|---|---|---|
| AW0 | 15,000 | 0 mm | −25 | 10 |
| AW1 | 16,000 | 5 mm | −15 | 9 |
| AW2 | 18,000 | 25 mm | −5 | 8 |
| AW3 | 20,000 | 35 mm | +5 | 7 |
| AW4 | 21,000 | 40 mm | +8 | 6 |

As illustrated in the table, based on leveling sensor reading, an output is generated. When arm 810a is displaced an angle α that is less than −25°, device 810 outputs 10 mA, and the SMLS raises the superstructure about 0 mm. When arm 810a is displaced an angle α that is between −25° and −15, device 810 outputs 9 mA, and the SMLS raises the superstructure about 5 mm. When arm 810a is displaced an angle α that is between −15° and −5, device 810 outputs 8 mA, and the SMLS raises the superstructure about 25 mm. When arm 810a is displaced an angle α that is between −5° and +5, device 810 outputs 7 mA, and the SMLS raises the superstructure about 35 mm. When arm 810a is displaced an angle α that is between +5° and +8, device 810 outputs 6 mA, and the SMLS raises the superstructure about 40 mm.

Numerous characteristics and advantages have been set forth in the foregoing description, together with details of structure and function. The disclosure, however, is illustrative only, and changes may be made in detail, especially in matters of shape, size, and arrangement of parts, within the principle of the invention, to the full extent indicated by the broad general meaning of the terms in which the general claims are expressed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

What is claimed is:

1. A railway vehicle configured to raise its access floor to platform level, the railway vehicle comprising:
    (a) a superstructure having an access floor on tracks;
    (b) a bogie;
    (c) a coil spring positioned between the superstructure and the bogie,
        the coil spring having an internal diameter ($D_{in}$) and an external diameter ($D_{ex}$), the coil spring having a top and a bottom and being configured to maintain, at least in part, the superstructure in a raised coasting configuration ($H_c$) relative to the bogie; and
    (d) a secondary suspension-mounting lift system (SMLS) comprising
        (d.1) a spring-mount (SM) mounted to the bottom of the coil spring comprising
            (d.1.a) a hollow cylinder aligned with the coil spring,
            (d.1.b) a flange connected to the cylinder, the flange extending externally from the coil spring and supporting one end of the coil spring, and
            (d.1.c) an annular-shaped expansion surface defined on the inside of a closed end of the SM, and
        (d.2) a piston assembly comprising
            (d.2.a) a hollow piston positioned within the hollow cylinder, the expansion surface defined between the piston and the hollow cylinder, and
            (d.2.b) a connector for hydraulic interface, the connector being in fluid communication with the piston and the expansion surface, wherein pressurized hydraulic fluid acts on the piston and the expansion surface and lifts the superstructure relative to the bogie to raise the railway vehicle's access door on tracks to the platform level.

2. The vehicle of claim 1, wherein hollow cylinder extends into the bottom of the coil spring and the flange abuts the bottom of the coil spring.

3. The vehicle of claim 2, wherein the bottom of the spring is frictionally attached to the flange.

4. The vehicle of claim 1, further including a seat on the bogie, the seat configured to receive the piston assembly.

5. The vehicle of claim 4, wherein the seat defines a finger for receiving an extrusion that serves as the connector.

6. The vehicle of claim 5, wherein the extrusion is positioned at an angle $\alpha=90°\pm45°$.

7. The vehicle of claim 6, further including a flexible hydraulic line, thereby accommodating the lifting of the superstructure and shimming of the suspension.

8. The vehicle of claim 1, further including a bumper assembly positioned inside the coil spring.

9. The vehicle of claim 8, wherein the bumper assembly is positioned opposite the SM.

10. The vehicle of claim 1, further including a hydraulic power unit (HPU) in fluid communication with the connector.

11. The vehicle of claim 10, further including an electronics control unit (ECU) in communication with the HPU, the ECU in communication with a level sensor configured to detect the suspension settlement in relation to a platform level and output a signal to actuate the hydraulic power unit to control fluid pressure to the piston assembly to raise or lower the spring and the superstructrure to align the access floor with the platform level.

12. A secondary suspension system for a railway vehicle on tracks, the secondary suspension system comprising:
    (a) a coil spring positioned between a superstructure and a bogie, the coil spring having an internal diameter ($D_{in}$) and an external diameter ($D_{ex}$), the coil spring having a top and a bottom and being configured to maintain, at least in part, the superstructure in a raised coasting configuration ($H_c$) relative to the bogie; and
    (b) a secondary suspension-mounting lift system (SMLS) comprising
        (b.1) a spring-mount (SM) mounted to the bottom of the coil spring comprising
            (b.1.a) a hollow cylinder aligned with the coil spring,
            (b.1.b) a flange connected to the cylinder, the flange extending externally from the coil spring and supporting one end of the coil spring, and
            (b.1.c) an annular-shaped expansion surface defined on the inside of a closed end of the SM, and
        (b.2) a piston assembly comprising
            (b.2.a) a hollow piston positioned within the hollow cylinder, the expansion surface defined between the piston and the hollow cylinder, and
            (b.2.b) a connector for hydraulic interface, the connector being in fluid communication with the piston, wherein pressurized hydraulic fluid acts on the piston and the expansion surface and lifts the superstructure relative to the bogie to raise the railway vehicle on tracks to a platform level.

13. The suspension system of claim 12, wherein hollow cylinder extends into the bottom of the coil spring and the flange abuts the bottom of the coil spring.

14. The suspension system of claim 12, wherein the spring is frictionally attached to the flange.

15. The suspension system of claim 14, further including a hydraulic power unit (HPU) in fluid communication with the connector.

16. The suspension system of claim 15, further including an electronics control unit (ECU) in communication with the HPU, the ECU in communication with a level sensor configured to detect the suspension settlement in relation to a platform level and output a signal to actuate the hydraulic power unit to control fluid pressure to the piston assembly to raise or lower the spring and the superstructrure to align the access floor with the platform level.

17. The suspension system of claim 12, wherein the SMLS further includes a seat on the bogie, the seat configured to receive the piston assembly.

18. The suspension system of claim 17, wherein the seat defines a finger for receiving an extrusion that serves as the connector.

19. The suspension system of claim 18, wherein the extrusion is positioned at an angle $\alpha=90°\pm45°$.

20. The suspension system of claim 19, further including a flexible hydraulic line, thereby accommodating the lifting of the superstructure and shimming of the suspension.

21. The suspension system of claim 12, further including a bumper assembly positioned inside the coil spring.

22. The suspension system of claim 21, wherein the bumper assembly is positioned opposite the SM.

23. A secondary suspension-mounting lift system (SMLS) for mounting to the bottom of a coil spring of a secondary suspension of a railway vehicle on tracks, the SMLS comprising:
    (a) a spring-mount (SM) comprising
        (a.1) a hollow cylinder configured to be aligned with the coil spring,
        (a.2) a flange connected to the cylinder, the flange extending externally from the coil spring and supporting one end of the coil spring, and
        (a.3) an annular-shaped expansion surface defined on the inside of a closed end of the SM, and
    (b.) a piston assembly comprising
        (b.1) a hollow piston positioned within the hollow cylinder, the expansion surface defined between the piston and the hollow cylinder, and
        (b.2) a connector for hydraulic interface, the connector being in fluid communication with the piston, wherein pressurized hydraulic fluid acts on the piston and the expansion surface and lifts the superstructure on tracks to a platform level.

24. The SMLS of claim 23, wherein the SM is configured to mount to the bottom of the coil spring.

25. The SMLS of claim 24, wherein hollow cylinder is configured to extend into the bottom of the coil spring and the flange is configured to abut the bottom of the coil spring.

26. The SMLS of claim 23, wherein spring can be frictionally attached to the flange.

27. The SMLS of claim 23, further including a seat configured to mount to the bogie and receive the piston assembly.

28. The SMLS of claim 27, wherein the seat defines a finger for receiving an extrusion that serves as the connector.

29. The SMLS of claim 28, wherein the extrusion is positioned at an angle $\alpha=90°\pm45°$.

30. The SMLS of claim 29, further including a flexible hydraulic line configured to accommodate the lifting of the superstructure and shimming of the suspension.

31. The SMLS of claim 23, further including a hydraulic power unit (HPU) configured to be in fluid communication with the connector.

32. The SMLS of claim 31, further including an electronics control unit (ECU) in communication with the HPU, the ECU in communication with a level sensor configured to detect the suspension settlement and output a signal to the hydraulic power unit based on platform level.

* * * * *